(12) United States Patent
Usami

(10) Patent No.: US 9,490,637 B2
(45) Date of Patent: Nov. 8, 2016

(54) POWER CONVERTING APPARATUS

(71) Applicant: TOSHIBA TEC KABUSHIKI KAISHA, Shinagawa-ku, Tokyo (JP)

(72) Inventor: Yutaka Usami, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 14/698,989

(22) Filed: Apr. 29, 2015

(65) Prior Publication Data

US 2015/0340871 A1 Nov. 26, 2015

(30) Foreign Application Priority Data

May 26, 2014 (JP) .................. 2014-108470

(51) Int. Cl.
| | |
|---|---|
| *H02J 1/00* | (2006.01) |
| *H02J 3/00* | (2006.01) |
| *H02J 4/00* | (2006.01) |
| *H02M 3/335* | (2006.01) |
| *H02M 1/42* | (2007.01) |
| *H02M 7/797* | (2006.01) |
| *H02M 1/00* | (2006.01) |

(52) U.S. Cl.
CPC .............. *H02J 4/00* (2013.01); *H02M 1/4258* (2013.01); *H02M 3/33569* (2013.01); *H02M 7/797* (2013.01); *H02M 2001/009* (2013.01); *Y02B 70/126* (2013.01); *Y10T 307/658* (2015.04)

(58) Field of Classification Search
CPC .. H02J 4/00; H02M 1/4258; H02M 3/33569; H02M 7/797; H02M 2001/009; Y02B 70/126; Y10T 307/658
USPC ........................................................... 307/72
See application file for complete search history.

(56) References Cited

U.S. PATENT DOCUMENTS

2012/0307529 A1* 12/2012 Chiba ..................... H02M 1/08
363/17

FOREIGN PATENT DOCUMENTS

| JP | 2014-007879 | 1/2014 |
|---|---|---|
| JP | 2014-039418 | 2/2014 |
| WO | 2014-073257 | 5/2014 |

* cited by examiner

*Primary Examiner* — Rexford Barnie
*Assistant Examiner* — Toan Vu
(74) *Attorney, Agent, or Firm* — Amin, Turocy & Watson LLP

(57) ABSTRACT

A power converting apparatus supplies, on the basis of a power supply voltage of an alternating-current power supply, a circuit current flowing in a power conversion circuit, and a direct current of a direct-current power supply, a pulse signal for alternately opening and closing a pair of a first switch and a fourth switch and a pair of a second switch and a third switch to the pair of the first switch and the forth switch and the pair of the second switch and the third switch such that an electric current in which a high-frequency component is mixed in a low-frequency component of the alternating-current power supply flows to the power conversion circuit.

5 Claims, 10 Drawing Sheets

POWER CONVERTING APPARATUS

CROSS-REFERENCE TO RELATED APPLICATION

This application is based upon and claims the benefit of priority from Japanese Patent Application No. 2014-108470, filed May 26, 2014, the entire contents of which are incorporated herein by reference.

FIELD

Embodiments described herein relate generally to a power converting apparatus that supplies electric power to a load simultaneously with bidirectional power conversion between a direct-current power supply and an alternating-current power supply.

BACKGROUND

As a method of converting an alternating-current voltage into a direct-current voltage, in general, two methods explained below are known. In a first method, a diode bridge circuit and a smoothing capacitor are used. The diode bridge circuit full-wave rectifies an alternating current from an alternating-current power supply. The smoothing capacitor smoothes a direct current after the full-wave rectification.

In the first method, irrespective of whether the alternating-current voltage is plus or minus, an electric current flows in a series circuit of two diodes. At this point, in the two diodes, a power loss equivalent to a product of electric currents respectively flowing through the diodes and forward voltages of the diodes occurs.

In a second method, a power factor improvement converter (PFC) is interposed between the diode bridge circuit and the smoothing capacitor in the first embodiment. The power factor improvement converter controls an electric current flowing to the alternating-current power supply to be a sine wave shape and control the electric current to be equal to a voltage phase of the alternating-current power supply.

In the second method, as in the first method, in the full-wave rectification, since an electric current flows in the series circuit of the two diodes, a power loss occurs. In addition, since an alternating-current alternately flows in a field effect transistor (FET) and a diode configuring the power factor improvement converter, a further loss occurs.

In the power factor improvement converter, an output voltage has to be set higher than an input voltage because a waveform of an input current needs to be formed in a sine wave shape. However, a voltage necessary for a load is not always a voltage higher than the input voltage. In that case, a step-down converter is connected to a post stage of the power factor improvement converter. A voltage boosted by the power factor improvement converter is stepped down to a desired voltage. A loss also occurs in the step-down. The entire power converting apparatus is configured by three stages of AC-DC conversion, DC-DC (step-up) conversion, and DC-DC (step-down) conversion. Power conversion efficiency appears as a product of conversion efficiencies of the stages. For example, if efficiency per one stage is 0.95, the power conversion efficiency of the three stages is 0.95×0.95×0.95=0.86. That is, even in excellent conversion having efficiency of 95%, the power conversion efficiency drops to 86% in three-stage connection. In this way, even if the respective conversion efficiencies are high, the conversion efficiency is markedly deteriorated if the power converting apparatus is configured in multiple stages.

Recently, there is an increasing demand for power saving of electronic apparatuses. At the same time, it is also an essential condition that current harmonic noise is not emitted to prevent an adverse effect on an external environment. Therefore, it is requested to achieve both of improvement of conversion efficiency of a power converting apparatus that supplies electric power to a load and a function of suppressing current harmonics.

On the other hand, as a method of converting a direct-current voltage into an alternating-current voltage, there is a method of converting a direct-current voltage into an alternating-current voltage using a pulse width modulation (PWM) inverter circuit. With this method, an electric current corresponding to pulse width can be fed to an alternating-current power supply side. Therefore, by controlling the pulse width in synchronization with the alternating-current voltage on the alternating-current power supply side, it is possible to generate an alternating-current waveform same as a voltage waveform on the alternating-current power supply side. However, in this method, in a process for generating the pulse width, a loss occurs in a switching element configuring an inverter and power conversion efficiency is deteriorated. This method has only an inverter function for converting the direct-current voltage into the alternating-current voltage. Therefore, to additionally provide a conversion function from the alternating-current voltage into the direct-current voltage in the opposite direction, a separate circuit for converting the alternating-current voltage into the direct-current voltage has to be prepared.

As explained above, to realize the bidirectional power conversion between the alternating-current power supply and the direct-current power supply, the circuit for converting the alternating-current voltage into the direct-current voltage and the circuit for converting the direct-current voltage into the alternating-current voltage need to be separately provided. Moreover, control for operating any one of the two circuits and stopping the other is necessary. Therefore, the circuits are made redundant and costs of the power converting apparatus increase. The power conversion efficiency of the power converting apparatus is low. Further, the power converting apparatus tends to be increased in size and weight.

JP-A-2011-147277 is an example of the related art.

DETAILED DESCRIPTION

An object of embodiments is to achieve both of improvement of conversion efficiency of a power converting apparatus that supplies electric power to a load simultaneously with bidirectional power conversion between an alternating-current power supply and a direct-current power supply and a function of suppressing current harmonics.

In general, according to one embodiment, a power converting apparatus includes a power conversion circuit and a control unit. In the power conversion circuit, a first switch and a second switch are connected in series, a third switch and a fourth switch are connected in series, and the first switch and the third switch are connected to each other and the second switch and the fourth switch are connected to each other to form a closed loop. Further, in the power conversion circuit, an alternating-current power supply, a first inductor, and a first capacitor are connected in series to form a closed loop. In the power conversion circuit, a series circuit formed by the first capacitor, a second inductor, and a primary winding wire of a transformer is connected between a connection point of the first switch and the second switch and a connection point of the third switch and the fourth switch. Further, in the power conversion circuit, a direct-current power supply is connected to both ends of the third switch and the fourth switch. A load or a load circuit is connected to a secondary winding wire of the transformer.

The control unit supplies, on the basis of a power supply voltage obtained from a unit that detects a voltage of the alternating-current power supply, a circuit current obtained from a unit that detects a circuit current flowing in the power conversion circuit, and a direct current obtained from a unit that detects an electric current flowing in the direct-current power supply, a pulse signal for alternately opening and closing a pair of the first switch and the fourth switch and a pair of the second switch and the third switch to the pair of the first switch and the forth switch and the pair of the second switch and the third switch such that an electric current in which a high-frequency component is mixed in a low-frequency component of the alternating-current power supply flows to the power conversion circuit.

A power converting apparatus in an embodiment is explained below with reference to the drawings.

Figure 1:
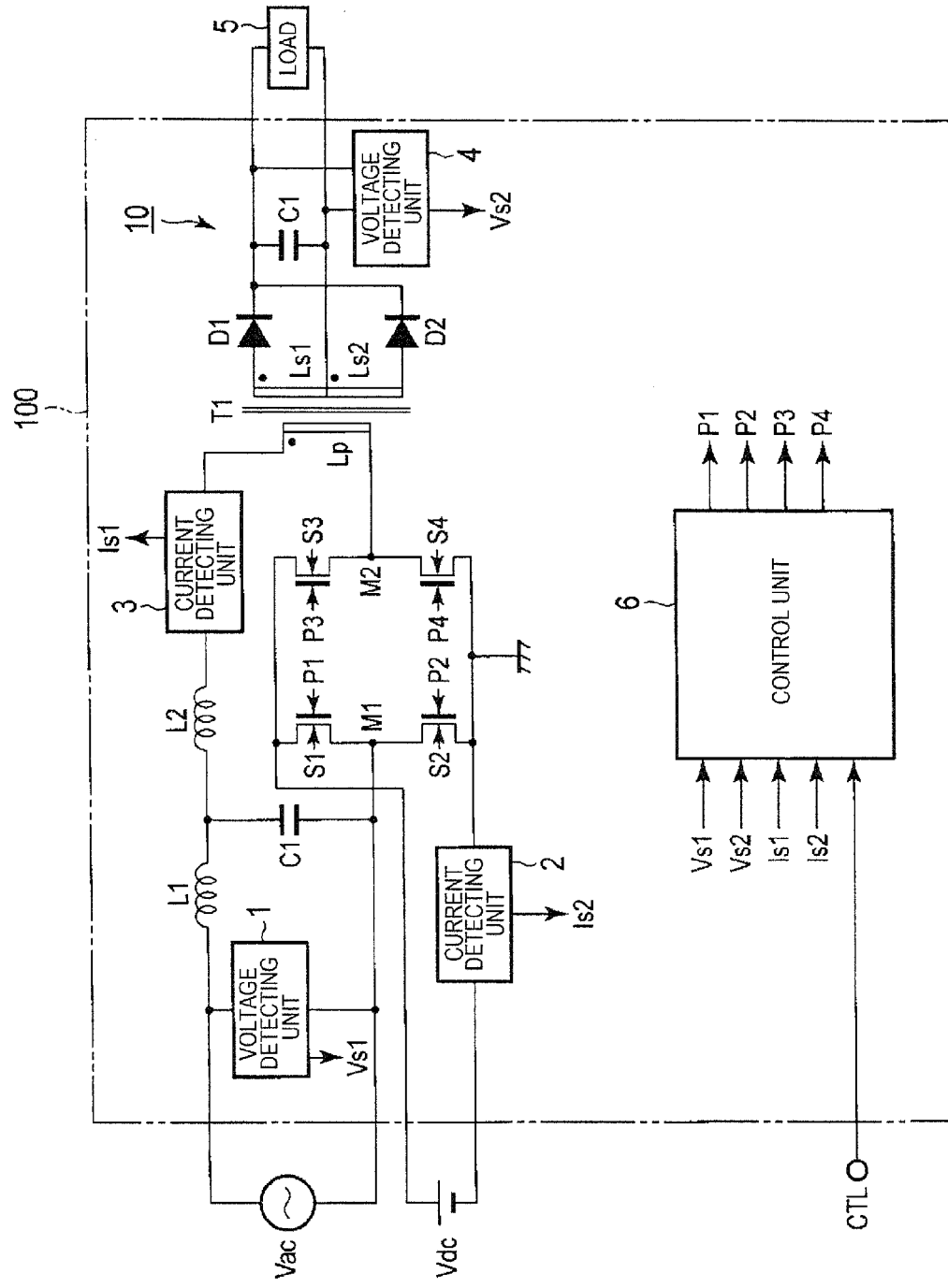
FIG. 1 is a circuit configuration diagram of a power conversion apparatus in an embodiment.

FIG. 1 is a circuit configuration diagram of a power converting apparatus 100. An alternating-current power supply Vac and a direct-current power supply Vdc are connected to the power converting apparatus 100 as an input or an output of bidirectional power conversion. The power converting apparatus 100 converts a part of electric power of the alternating-current power supply Vac or the direct-current power supply Vdc into an insulated direct-current voltage and outputs the direct-current voltage to a load 5.

The power converting apparatus 100 includes first to fourth semiconductor switches (hereinafter simply referred to as switches) S1, S2, S3, and S4, first and second inductors L1 and L2, first and second capacitors C1 and C2, a transformer T1, and first and second diodes D1 and D2. As all of the switches S1 to S4, N-type FETs or GaNs, SiC elements, or the like having characteristics equivalent to the characteristics of the N-type FETs are used.

In the power converting apparatus 100, the four first to fourth switches S1, S2, S3, and S4 are connected by a method called bridge. That is, a drain terminal of the first switch S1 is connected to a drain terminal of the third switch S3. A source terminal of the first switch S1 is connected to a drain terminal of the second switch S2. A source terminal of the third switch S3 is connected to a drain terminal of the fourth switch S4. A source terminal of the second switch S2 is connected to a source terminal of the fourth switch S4. For convenience of explanation, a node name of a connection point of the source terminal of the first switch S1 and the drain terminal of the second switch S2 is referred to as M1 terminal. A node name of a connection point of the source terminal of the third switch S3 and the drain terminal of the fourth switch S4 is referred to as M2 terminal.

In the power converting apparatus 100, the first capacitor C1, the second inductor L2, and a primary winding wire Lp of the transformer T1 are connected in series between the M1 terminal and the M2 terminal. In the power converting apparatus 100, the alternating-current power supply Vac is connected to both the ends of the first capacitor C1 via the first inductor L1. In the power converting apparatus 100, the direct-current power supply Vdc is connected between the source terminal of the third switch S3 and the drain terminal of the fourth switch S4.

In the power converting apparatus 100, two secondary winding wires Ls1 and Ls2 of the transformer T1 are connected in series. In the power converting apparatus 100, an anode terminal of the first diode D1 is connected to one ends (on the secondary winding wire Ls1 side) of the secondary winding wires Ls1 and Ls2 connected in series and an anode terminal of the second diode D2 is connected to the other end (on the secondary winding wire Ls2 side). In the power converting apparatus 100, a cathode terminal of the first diode D1 is connected to a cathode terminal of the second diode D2. In the power converting apparatus 100, the second capacitor C3 and the load 5 are connected in parallel between a middle point of the series connection of the secondary winding wire Ls1 and the secondary winding wire Ls2 and a connection point of the cathode terminals of the first and second diodes D1 and D2.

The first and second diodes D1 and D2 and the second capacitor C3 configure a rectification smoothing circuit. For example, if an electric current flows to the second inductor L2 from the side of the connection point of the first inductor L1 and the first capacitor C1 to the side of the primary winding wire Lp of the transformer T1, a winding wire of the transformer T1 is set such that the electric current flows to the first diode D1. Then, if the electric current flowing to the second inductor L2 is reversed, the electric current flows to the second diode D2 side. As a result, irrespective of the direction of a circuit current Is1, the electric current is supplied to the second capacitor C2 from the first diode D1 side or the second diode D2 side. That is, irrespective whether the circuit current Is1 is plus or minus, a part of the circuit current Is1 flows into the second capacitor C2 via the transformer T1 and is accumulated in the second capacitor C2 as charges.

In this embodiment, a configuration from the rectification smoothing circuit including the first and second diodes D1 and D2 and the second capacitor C2 to the load 5 connected a smoothing output voltage of the rectification smoothing circuit is referred to as load circuit 10. Note that the load circuit 10 defined here is not limited to the implementation mode explained above. The load circuit 10 is a general term of a circuit configuration disposed between the secondary winding wires Ls1 and Ls2 and the load 5 and electrically connecting the secondary winding wires Ls1 and Ls2 and the load 5.

The power converting apparatus 100 includes voltage detecting units 1 and 4 and current detecting units 2 and 3. Specifically, in the power converting apparatus 100, the voltage detecting unit 1 is connected between both terminals of the alternating-current power supply Vac. The voltage detecting unit 1 detects a voltage applied from the alternating-current power supply Vac to the power converting apparatus 100, a so-called alternating-current power supply voltage and outputs a detection signal (a voltage signal) Vs1.

In the power converting apparatus 100, the current detecting unit 2 is connected between a minus terminal of the direct-current power supply Vdc and the source terminal of the second switch S2. The current detecting unit 2 detects an electric current flowing in the direct-current power supply Vdc, a so-called direct-current power supply current and outputs a detection signal (a current signal) Is2 of the electric current. Note that the position of the current detecting unit 2 is not limited to the implementation mode explained above. For example, if the current detecting unit 2 is connected between a plus terminal of the direct-current power supply Vdc and the drain terminal of the first switch S2, the electric current flowing in the direct-current power supply Vdc can be detected.

In the power converting apparatus 100, the current detecting unit 3 is connected between the second inductor L2 and the primary winding wire Lp of the transformer T1. The current detecting unit 3 detects an electric current flowing in the second inductor L2, a so-called circuit current and outputs a detection signal (a current signal) Is1 of the electric current.

In the power converting apparatus 100, the voltage detecting unit 4 is connected between both terminals of the second capacitor C2. The voltage detecting unit 4 detects a voltage applied from the second capacitor C2 to the load 5, a so-called output voltage and outputs a detection signal (a voltage signal) Vs2 of the voltage.

The power converting apparatus 100 includes a control unit 6. The control unit 6 receives, as inputs, the detection signals Vs1, Vs2, Is1, and Is2 respectively output from the voltage detecting units 1 and 4 and the current detecting units 2 and 3 and a control signal CTL. The control signal CTL is a signal, a level of which is dynamically adjusted according to switching of a not-shown control switch.

The control unit 6 generates, on the basis of the input signals Vs1, Vs2, Is1, Is2, and CTL, gate driving signals P1, P2, P3, and P4 of the first to fourth switches S1 to S4 configuring a bridge and outputs the gate driving signals P1, P2, P3, and P4 of the gate driving signals P1, P2, P3, and P4 respectively to the gate terminals of the switches S1 to S4. The switches S1, S2, S3, and S4 respectively conduct while the gate driving signals P1, P2, P3, and P4 are supplied to the gate terminals.

In the power converting apparatus 100, a low-pass filter is formed by the first inductor L1 and the first capacitor C1. Therefore, an electric current flowing to the alternating-current power supply Vac side through the first inductor L1, a so-called alternating-current power supply current is only a low-frequency component of, for example, 50 Hz. On the other hand, the power converting apparatus 100 can obtain a high-frequency current of, for example, 100 [kHz] according to switching of the first to fourth four switches S1, S2, S3, and S4.

In order to obtain the high-frequency current, the power converting apparatus 100 uses a pair of plus and minus envelopes defining a peak of the circuit current Is1. The envelopes have a sine wave shape. The power converting apparatus 100 alternately switches a pair of the first switch S1 and the fourth switch S4 and a pair of the second switch S2 and the third switch S3 at appropriate timing such that the direction of an electric current is switched between the pair of envelopes. A high-frequency current of, for example, 100 [kHz] is generated by the switching.

If the high-frequency current of 100 [kHz] is generated, an electric current flowing to the first switch S1 or the second switch S2 through the first capacitor C1 changes to an electric current of a low-frequency component of 50 [Hz] and an electric current of a high-frequency component of 100 [kHz]. Therefore, the circuit current (the detection signal Is1) detected by the current detecting unit 3 changes to an electric current in which the low-frequency component of 50 [Hz] and the high-frequency component of 100 [kHz] are mixed. As a result, the entire power converting apparatus 100 operates with mixed alternating currents including these different two kinds of frequencies.

Operation modes of the power converting apparatus 100 are explained. Note that it is assumed that a commercial power supply of 100 [V] and 50 [Hz] is used as the alternating-current power supply Vac and a direct-current power supply of 400 [V] is used as the direct-current power supply Vdc to supply electric power of 200 [W] to the load 5.

First, an operation mode for transmitting all the electric power of the alternating-current power supply Vac to the load 5 (hereinafter referred to as alternating-current input mode) is explained. Incidentally, since the alternating-current voltage is 100 [V], an electric current of 2 [A] is necessary to obtain electric power of 200 [W]. That is, if an electric current finally flowing into the alternating-current power supply Vac through the first inductor L1 is 2 [A], it is possible to supply electric power of 200 [W] to the load 5.

Figure 2:
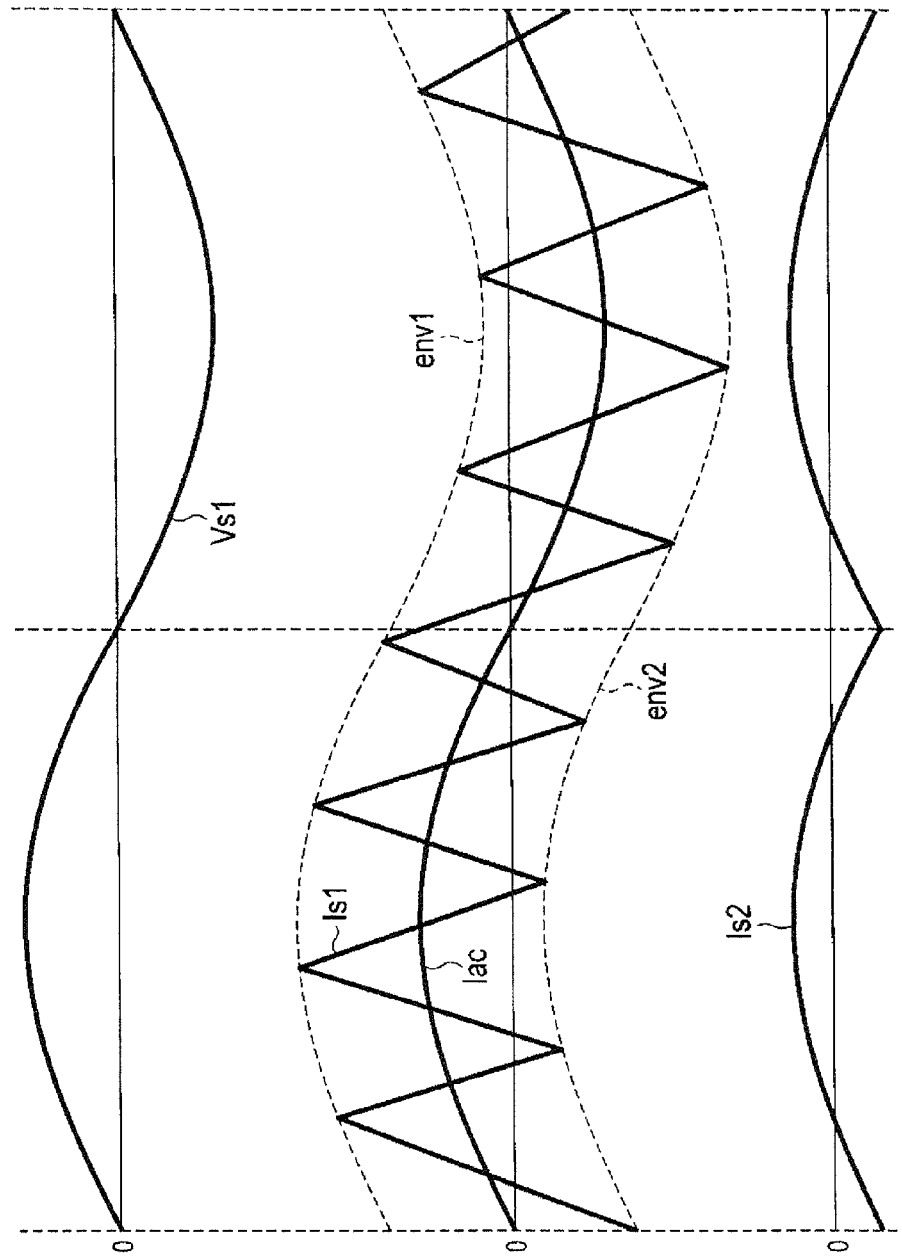
FIG. 2 is a waveform chart of various signals in the operation of the power converting apparatus in an alternating-current input mode.

In the case of the alternating-current input mode, an electric current does not flow to the direct-current power supply Vdc in both the directions. That is, there is no power supply from the direct-current power supply Vdc and there is no power output from the direct-current power supply Vdc. Waveforms of signals Vs1, Is1, Iac, env1, env2, and Is2 in the alternating-current input mode are shown in FIG. 2. The signal Iac is a detection signal of an alternating-current power supply current. The signals env1 and env2 are a pair of plus and minus envelope signals defining a circuit current.

As shown in FIG. 2, in the alternating-current input mode, the power converting apparatus 100 generates a pair of plus and minus envelope signals env1 and env2 to be similar to the detection signal Vs1 of the alternating-current power supply voltage in both of an amplitude and a phase. The power converting apparatus 100 feeds the circuit current (the detection signal Is1) to turn back between the envelope signals env1 and env2. Then, an average of the circuit current is equal to the alternating-current power supply current represented by the detection signal Iac.

If the envelope signals env1 and env2 are set to be the same as the alternating-current power supply in the phase and the amplitude in this way, the alternating-current power supply current is in phase with the alternating-current power supply Vac. This event means that electric power is supplied from the alternating-current power supply Vac to the load circuit 10. That is, the alternating-current power supply Vac acts as a power supply source to the load 5.

On the other hand, an electric current flowing to the direct-current power supply Vdc is in a state of zero current in average, although there are increases and decreases in one cycle of the alternating-current power supply Vac, as indicated by the detection signal Is2. This state of zero current means that an electric current is not generated from the direct-current power supply Vdc. That is, the direct-current power supply Vdc does not act as a power supply source to the load 5. The direct-current power supply Vdc does not act as a power supply destination of the bidirectional power conversion either.

An operation mode for transmitting electric power of the alternating-current power supply Vac and electric power of the direct-current power supply Vdc to the load 5 (hereinafter referred to as alternating-current input and direct-current input mode) is explained.

Figure 3:
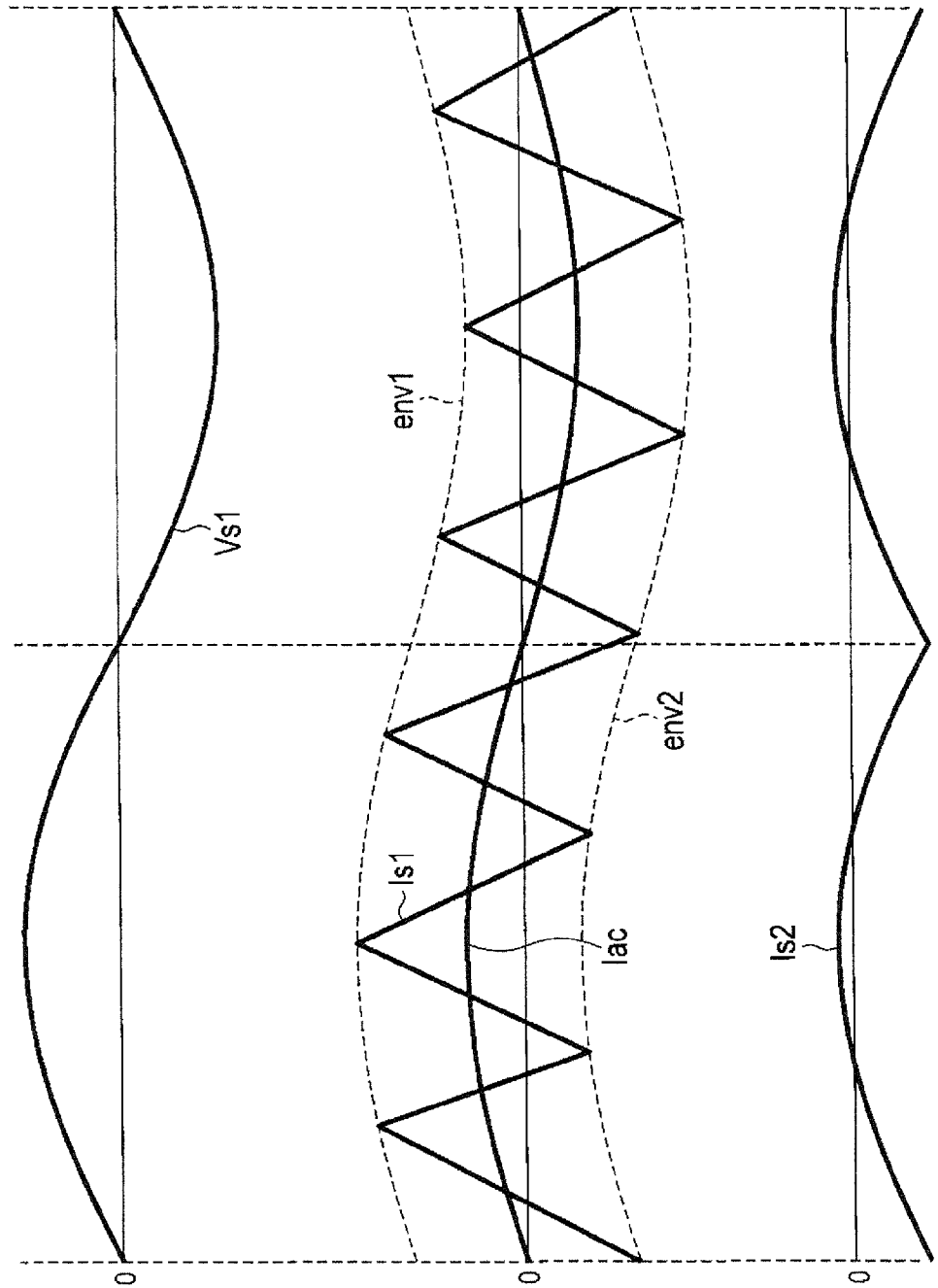
FIG. 3 is a waveform chart of various signals in the operation of the power converting apparatus in an alternating-current input and direct-current input mode.

Waveforms of the signals Vs1, Is1, Iac, env1, env2, and Is2 in the alternating-current input and direct-current input mode are shown in FIG. 3. As shown in FIG. 3, in the alternating-current input and direct-current input mode, the power converting apparatus 100 reduces the amplitude of the envelope signals env1 and env2 to be smaller than the amplitude in the alternating-current input mode. The phase of the envelope signals env1 and env2 is the same as the phase of the alternating-current power supply Vac. For example, if the amplitude of the envelope signals env1 and env2 is a half of the amplitude in the alternating-current input mode, the alternating-current power supply current represented by the detection signal Iac is also a half of the alternating-current power supply current in the alternating-current input mode. This event means that the electric power supplied from the alternating-current power supply Vac to the load circuit 10 decreases to a half.

On the other hand, the width between the plus envelope signal env1 and the minus envelope signal env2 is the same as the width in the alternating-current input mode. Therefore, the electric power supplied to the load 5 is the same as the electric power in the alternating-current input mode. Therefore, the power supply from the alternating-current power supply Vac is insufficient. The power converting apparatus 100 supplements the insufficiency with the power supply from the direct-current power supply Vdc.

In the alternating-current input and direct-current input mode, a waveform of the direct-current power supply current indicated by the detection signal Is2 shifts to a minus side as a whole (in FIG. 3, the lower side than the zero level). As a result, an area of a section in which the direct-current power supply current takes a minus (−) value is larger than an area of a section in which the direct-current power supply current takes a plus (+) value. This event means that, since the direct-current power supply current is a minus value when averaged, the load circuit 10 receives the supply of the electric power from the direct-current power supply Vdc. That is, both of the alternating-current power supply Vac and the direct-current power supply Vdc act as a power supply source to the load 5.

An operation mode for transmitting all the electric power of the direct-current power supply Vdc to the load 5 (hereinafter referred to as direct-current input mode) is explained.

Figure 4:
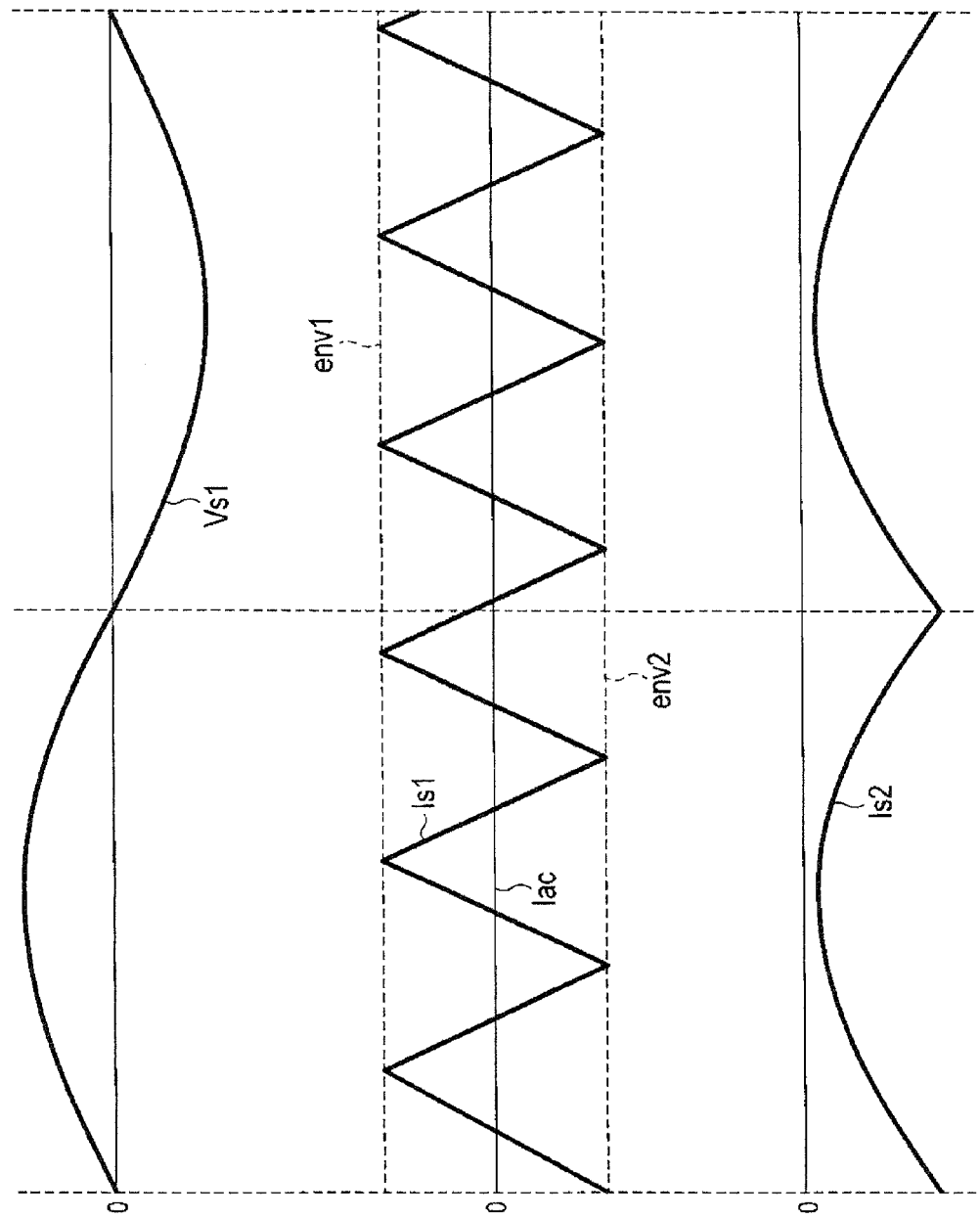
FIG. 4 is a waveform chart of various signals in the operation of the power converting apparatus in a direct-current input mode.

Waveforms of the signals Vs1, Is1, Iac, env1, env2, and Is2 in the direct-current input mode are shown in FIG. 4. As shown in FIG. 4, in the direct-current input mode, the power converting apparatus 100 reduces the amplitude of the envelope signals env1 and env2 to zero. If the amplitude is zero, the envelope signals env1 and env2 change to a linear shape. Therefore, even if the circuit current (the detection signal Is1) is fed to turn back between the envelope signals env1 and env2, the alternating-current power supply current indicated by the detection signal Iac is zero. This state of zero current means that an electric current is not generated from the alternating-current power supply Vac. That is, the alternating-current power supply Vac does not act as a power supply source to the load 5. The alternating-current power supply Vac does not act as a power supply destination of the bidirectional power conversion as well.

On the other hand, the width between the plus envelope signal env1 and the minus envelope signal env2 is the same as the width in the alternating-current input mode. Therefore, the electric power supplied to the load 5 is the same as the electric power in the alternating-current input mode. Therefore, the power converting apparatus 100 supplements the lack of the power supply from the alternating-current power supply Vac with the power supply from the direct-current power supply Vdc.

In the direct-current input mode, a waveform of the direct-current power supply current indicated by the detection signal Is2 shifts to a minus side as a whole (in FIG. 4, the lower side than the zero level). This event means that the load circuit 10 receives the supply of the electric power from the direct-current power supply Vdc. That is, the direct-current power supply Vdc act as a power supply source to the load 5.

An operation mode for transmitting the electric power of the alternating-current power supply Vac to the load 5 and the direct-current power supply Vdc (hereinafter referred to as alternating-current input and direct-current output mode) is explained.

Figure 5:
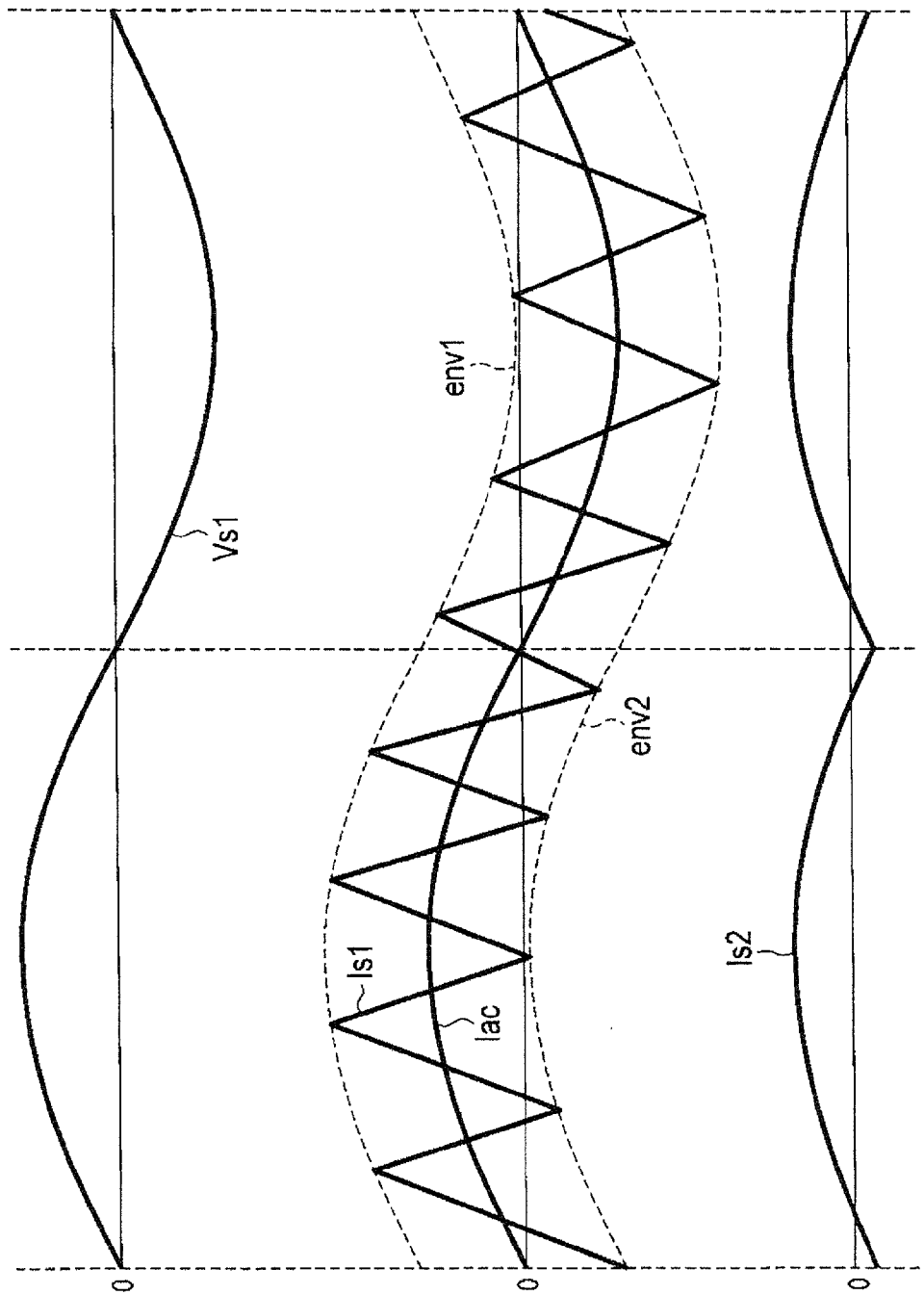
FIG. 5 is a waveform chart of various signals in the operation of the power converting apparatus in an alternating-current input and direct-current output mode.

Waveforms of the signals Vs1, Is1, Iac, env1, env2, and Is2 in the alternating-current input and direct-current output mode are shown in FIG. 5. As shown in FIG. 5, in the alternating-current input and direct-current output mode, the power converting apparatus 100 reduces the width between the plus envelope signal env1 and the minus envelope signal env2. The phase and the amplitude of the envelope signals env1 and env2 is the same as the phase and the amplitude in the alternating-current input mode. In this case, the alternating-current power supply current indicated by the detection signal Iac is in phase with the alternating-current power supply Vac. This event means that the electric power is supplied from the alternating-current power supply Vac to the load circuit 10. That is, the alternating-current power supply Vac acts as a power supply source to the load 5.

On the other hand, a waveform of the direct-current power supply current indicated by the detection signal Is2 shifts to a plus side as a whole (in FIG. 5, the upper side than the zero level). As a result, an area of a section in which the direct-current power supply current takes a plus value is smaller than an area of a section in which the direct-current power supply current takes a minus value. This event means that, since the direct-current power supply current takes a plus value when averaged, the direct-current power supply Vdc receives the supply of the electric power from the alternating-current power supply Vac. That is, the alternating-current power supply Vac not only acts as a power supply source to the load 5 but also acts as a power supply source to the direct-current power supply Vdc.

An operation mode for transmitting the electric power of the direct-current power supply Vdc to the load 5 and the alternating-current power supply Vac (hereinafter referred to as direct-current input and alternating-current output mode) is explained.

Figure 6:
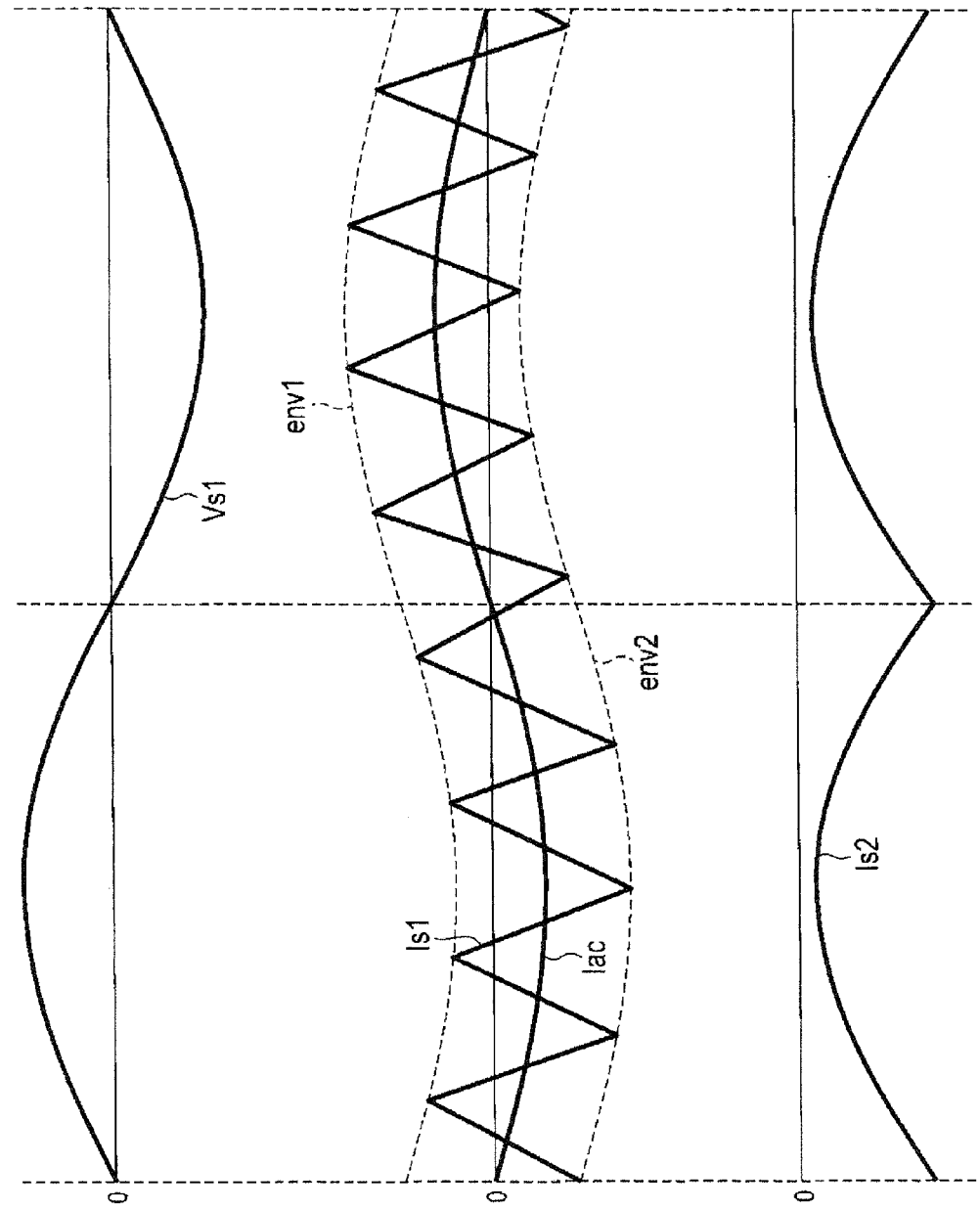
FIG. 6 is a waveform chart of various signals in the operation of the power converting apparatus in a direct-current input and alternating-current output mode.

Waveforms of the signals Vs1, Is1, Iac, env1, env2, and Is2 in the direct-current input and alternating-current output mode are shown in FIG. 6. As shown in FIG. 6, in the direct-current input and alternating-current output mode, the power converting apparatus 100 reverses the phase of the envelope signals env1 and env2 from the phase in the alternating-current input mode and reduces with width between the plus envelope signal env1 and the minus envelope signal env2. The amplitude of the envelope signals env1 and env2 is the same as the amplitude in the alternating-current input mode. In this case, the alternating-current power supply current indicated by the detection signal Iac is anti-phase with the alternating-current power supply Vac. This event means that electric power is supplied to the alternating-current power supply Vac.

In the direct-current input and alternating-current output mode, a waveform of the direct-current power supply current indicated by the detection signal Is2 shifts to a minus side as a whole (in FIG. 6, the lower side than the zero level). This event means that the load circuit 10 receives the supply of the electric power from the direct-current power supply Vdc. That is, the direct-current power supply Vdc not only acts as a power supply source to the load 5 but also acts as a power supply source to the alternating-current power supply Vac.

The operation modes explained above are controlled by the control unit 6. Therefore, the control unit 6 is explained with reference to FIGS. 7 to 9.

Figure 7:
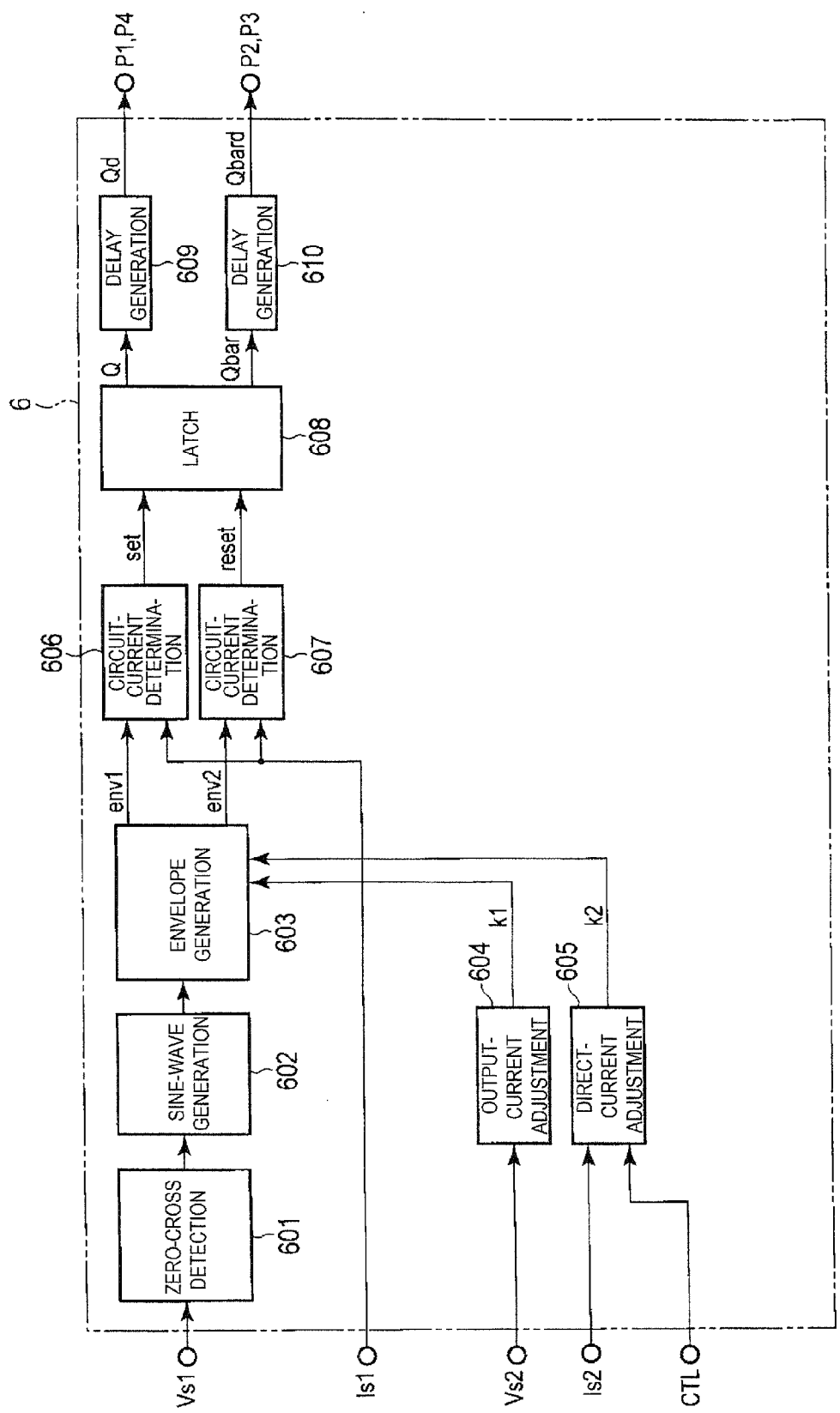
FIG. 7 is a block diagram showing the configuration of a control unit in the power converting apparatus.

FIG. 7 is a block diagram showing the configuration of the control unit 6. As shown in FIG. 7, the control unit 6 includes a zero-cross detecting unit 601, a sine-wave generating unit 602, an envelope generating unit 603, an output-current adjusting unit 604, a direct-current adjusting unit 605, a circuit-current determining unit 606 on a plus side, a circuit-current determining unit 607 on a minus side, a latch circuit 608, a first delay generating unit 609, and a second delay generating unit 610.

The zero-cross detecting unit 601 receives the detection signal Vs1 as an input. The detection signal Vs1 is an alternating-current power supply voltage detected by the voltage detecting unit 1. The zero-cross detecting unit 601 detects the phase and the cycle of the alternating-current power supply voltage from the detection signal Vs1.

The sine-wave generating unit 602 receives, as an input, a signal indicating the phase and the cycle detected by the zero-cross detecting unit 601. The sine-wave generating unit 602 generates, from the signal of the zero-cross detecting unit 601, a sine wave synchronizing with the phase and the cycle of the alternating-current power supply voltage.

The envelope generating unit 603 receives, as an input, a signal indicating the sine wave generated by the sine-wave generating unit 602. The envelope generating unit 603 receives, as inputs, a coefficient k1 given from the output-current adjusting unit 604 and a coefficient k2 given from the direct-current adjusting unit 605. The envelope generating unit 603 sets, as a basic waveform of an envelope, a waveform of the sine wave generated by the sine-wave generating unit 602, adjusts the basic waveform with the coefficients k1 and k2, and generates the pair of plus and minus envelope signals env1 and env2.

The output-current adjusting unit 604 receives the detection signal Vs2 as an input. The detection signal Vs2 is an output voltage detected by the voltage detecting unit 4. The output-current adjusting unit 604 outputs the coefficient k1 according to a change in the output voltage. The coefficient k1 relates to adjustment of the width between the plus envelope signal env1 and the minus envelope signal env2. For example, if the output voltage is high, the output-current adjusting unit 604 outputs the coefficient k1 for reducing the width of the envelope signals env1 and env2. Conversely, if the output voltage is low, the output-current adjusting unit 604 outputs the coefficient k1 for increasing the width of the envelope signals env1 and env2. In this embodiment, if the coefficient k1 is increased, the width of the envelope signals env1 and env2 increases. If the coefficient k1 is reduced, the width of the envelope signals env1 and env2 decreases.

The direct-current adjusting unit 605 receives the detection signal Is2 and the control signal CTL as inputs. The detection signal Is2 is a direct-current power supply current detected by the current detecting unit 2. The direct-current adjusting unit 605 outputs the coefficient k2 according to the direct-current power supply current Is2 and a level of the control signal CTL. The coefficient k2 relates to adjustment of the amplitude in the envelope signals env1 and env2. For example, if the direct-current power supply current is large with respect to the control signal CTL, the direct-current adjusting unit 605 outputs the coefficient k2 for increasing the amplitude of the envelope signals env1 and env2. If the amplitude of the envelope signals env1 and env2 increases, the direct-current power supply current decreases. Conversely, if the direct-current power supply current is small with respect to the control signal CTL, the direct-current adjusting unit 605 outputs the coefficient k2 for reducing the amplitude of the envelope signals env1 and env2. If the amplitude of the envelope signals env1 and env2 decreases, the direct-current power supply current increases. In this embodiment, if the coefficient k2 is reduced, the amplitude of the envelope signals env1 and env2 increases. If the coefficient k2 is increased, the amplitude of the envelope signals env1 and env2 decreases. The increase and the decrease of the amplitude can be realized by increasing or reducing an amplification factor with respect to a sine wave signal.

The circuit-current determining unit 606 receives the plus envelope signal env1 and the detection signal Is1 as inputs. The detection signal Is1 is a circuit current detected by the current detecting unit 3. In a state in which the circuit current is smaller than the envelope signal env1, the circuit-current determining unit 606 outputs nothing. If the circuit current reaches or exceeds the envelope signal env1, the circuit-current determining unit 606 outputs a pulse signal SET.

The circuit-current determining unit 607 receives the minus envelope signal env1 and the detection signal Is1 as inputs. The detection signal Is1 is a circuit current detected by the current detecting unit 3. In a state in which the circuit current is larger than the envelope signal env2, the circuit-current determining unit 607 outputs nothing. If the circuit current reaches or falls below the envelope signal env2, the circuit-current determining unit 607 outputs a pulse signal RESET.

The latch circuit 608 inputs the pulse signal SET, which is output from the circuit-current determining unit 606, to a set terminal and inputs the pulse signal RESET, which is output from the circuit-current determining unit 607, to a reset terminal. If the pulse signal SET is input to the set terminal, the latch circuit 608 changes a normal output Q to an "H" state and, at the same time, changes an inverted output Qbar to an "L" state and maintains these states. If the pulse signal RESET is input to the reset terminal, the latch circuit 608 changes the normal output Q to the "L" state and, at the same time, changes the inverted output Qbar to the "H" state and maintains these states.

The first delay generating unit 609 receives the normal output Q of the latch circuit 608 as an input. If the state of the normal output Q is switched from the "L" state to the "H" state, the first delay generating unit 609 generates a predetermined delay time d1 and outputs a signal Qd of the normal output Q delayed by the delay time d1. The signal Qd is output from the control unit 6 as the gate driving signals P1 and P4 of the first switch S1 and the fourth switch S4.

The second delay generating unit 610 receives the inverted output Qbar of the latch circuit 608 as an input. If the state of the inverted output Qbar is switched from the "L" state to the "H" state, the second delay generating unit 610 generates a predetermined delay time d2 and outputs a signal Qbard of the inverted output Qbar delayed by the delay time d2. The signal Qbard is output from the control unit 6 as the gate driving signals P2 and P3 of the second switch S2 and the third switch S3.

Figure 8:
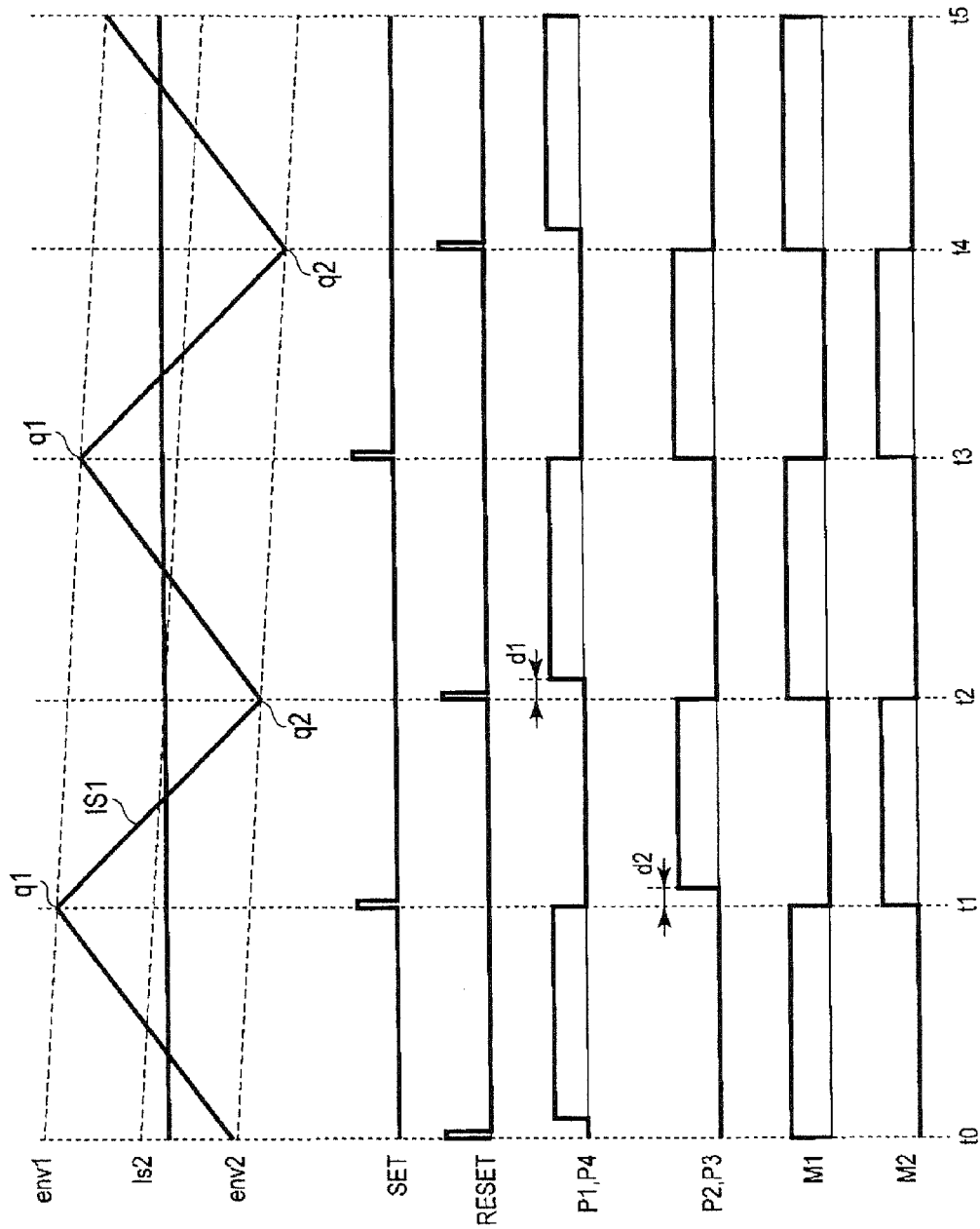
FIG. 8 is a signal waveform chart used for explanation of the control unit.

FIG. 8 is a waveform chart showing waveforms of the detection signals Is1 and Iac input to the control unit 6, waveforms of the various signals env1, env2, SET, RESET, and P1 to P4 generated by the control unit 6, and waveforms of voltage signals applied to the M1 terminal and the M2 terminal.

In FIG. 8, points in time t0, t2, and t4 are points in time (minus reaching points q2) when the circuit current indicated by the detection signal Is1 reaches the minus envelope signal env2. On the other hand, points in time t1, t3, and t5 are points in time (plus reaching points q1) when the circuit current indicated by the detection signal Is1 reaches the plus envelope signal env1.

If the circuit current reaches the plus envelope signal env1, the pulse signal SET is output according to the action of the circuit-current determining unit 606. Then, the gate driving signals P1 and P4 change to "L" in synchronization with the pulse signal SET according to the action of the latch circuit 608 and the first and second delay generating units 609 and 610. After the delay time d2 elapses, the gate driving signals P2 and P3 change to "H".

If the gate driving signals P1 and P4 change to "L", the first switch S1 and the fourth switch S4 open. If the gate driving signals P2 and P3 change to "H", the second switch S2 and the third switch S3 conduct. If the first switch S1 and the fourth switch S4 open, the voltage of the M1 terminal changes to the zero level and the voltage of the M2 terminal changes to the voltage of the direct-current power supply Vdc.

If the circuit current reaches the minus envelope signal env2, the pulse signal RESET is output according to the action of the circuit-current determining unit 607. Then, the gate driving signals P2 and P3 change to "L" in synchronization with the pulse signal RESET according to the action of the latch circuit 608 and the first and second delay generating units 609 and 610. After the delay time d1 elapses, the gate driving signals P1 and P4 changes to "H".

If the gate driving signals P2 and P3 change to "L", the second switch S2 and the third switch S3 open. If the gate driving signals P1 and P4 change to "H", the first switch S1 and the fourth switch S4 conduct. If the second switch S2 and the third switch S3 open, the voltage of the M2 terminal changes to the zero level and the voltage of the M1 terminal changes to the voltage of the direct-current power supply Vdc.

As explained above, in the M1 terminal and the M2 terminal, a state in which the voltage is in the zero level and a state in which the voltage of the direct-current power supply Vdc is applied are alternately repeated. A series circuit of the first capacitor C1, the second inductor L2, and the transformer T1 is connected between the M1 terminal and the M2 terminal. Therefore, a high-frequency alternating current synchronizing with ON and OFF switching timing of the switches S1 to S4 flows to the series circuit.

Figure 9:
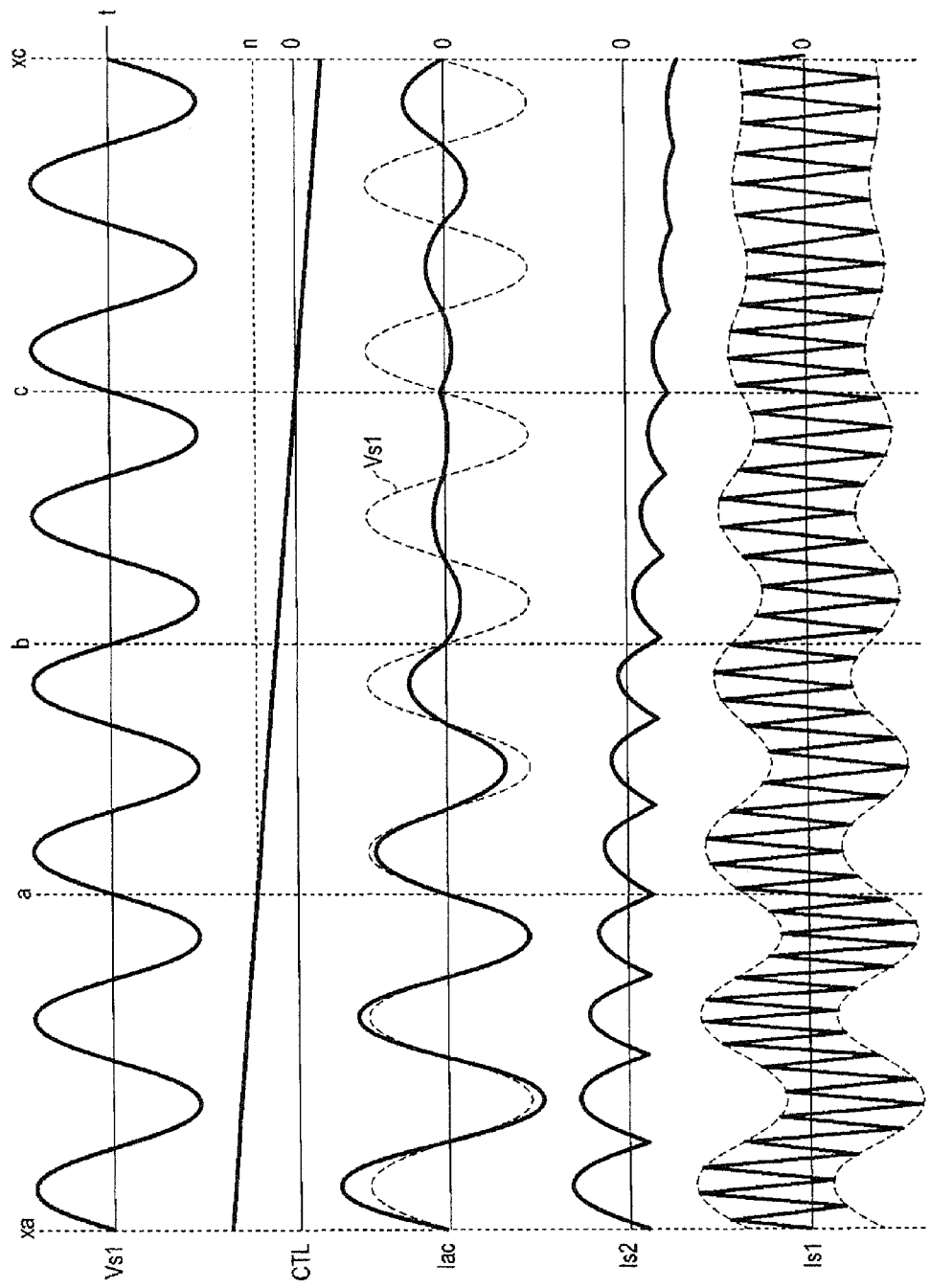
FIG. 9 is a waveform chart showing a relation between a control signal and detection signals.

FIG. 9 is a waveform chart showing a relation between the control signal CTL and the detection signals Vs1, Iac, Is2, and Is1. In FIG. 9, the abscissa indicates time. A level of the control signal CTL at a point in time "a" is assumed as n (n>0). A level of the control signal CTL at a point in time "b" is assumed to as n/2. A level of the control signal CTL at a point in time "c" is assumed as 0. A level of the control signal CTL at a point in time xc is assumed as −(n/2). A level of the control signal CTL at a point in time xa is assumed as 3n/2.

First, operation at the point in time "a" is explained. At the point in time "a", as it is evident from the detection signal Vs1 and the detection signal Iac, an alternating-current power supply current in phase with a voltage phase of the alternating-current power supply Vac flows. At this point, the direct-current power supply current indicated by the detection signal Is2 takes plus and minus values corresponding to the phase of the alternating-current power supply Vac. However, when averaged, an electric current is zero. That is, power supply from the direct-current power supply Vdc side to the load circuit 10 side is not performed. Power supply to the direct-current power supply Vdc is not performed either. Therefore, electric power supplied to the load 5 is only the electric power from the alternating-current power supply Vac.

The operation at the point in time "a" coincides with the operation in the alternating-current input mode. That is, by setting the level of the control terminal CTL to n, the control unit 6 can set the operation mode of the power converting apparatus to the alternating-current input mode. Incidentally, in the alternating-current input mode, electric power is supplied from the alternating-current power supply Vac to the load circuit 10 side. Therefore, the electric current supplied from the alternating-current power supply Vac is the largest.

Operation at the point in time "b" is explained. At the point in time "b", the amplitude of the envelope signals env1 and env2 is smaller than the amplitude at the point in time "a". According to the decrease in the amplitude, the alternating-current power supply current decreases. On the other hand, the direct-current power supply current shifts in the minus direction as a whole and changes to a minus value.

The width between the plus envelope signal env1 and the minus envelope signal env2 is the same as the width at the point in time "a". Therefore, there is no change in the electric power supplied to the load 5. That is, at the point in time "b", the electric power supplied from the alternating-current power supply Vac to the load circuit 10 decreases. The decrease is supplemented by the power supply from the direct-current power supply Vdc.

The operation at the point in time "b" coincides with the operation in the alternating-current input and direct-current input mode. That is, by setting the level of the control terminal CTL to a plus value smaller than n, the control unit 6 can set the operation mode of the power converting apparatus to the alternating-current input and direct-current input mode.

Operation at the point in time "c" is explained. At the point in time "c", the amplitude of the envelope signals env1 and env2 is smaller than the amplitude at the point in time "b" and the alternating-current power supply current is zero. On the other hand, a minus value of the direct-current power supply current is larger than the minus value at the point in time "b".

The width between the plus envelope signal env1 and the minus envelope signal env2 is the same as the width at the point in time "a" and the point in time "b". Therefore, there is no change in the electric power supplied to the load 5. That is, at the point in time "c", electric power is not supplied from the alternating-current power supply Vac to the load circuit 10. The lack of power supply is supplemented by the power supply from the direct-current power supply Vdc.

The operation at the point in time "c" coincides with the operation in the direct-current input mode. That is, by setting the level of the control terminal CTL to the level 0 at the point in time "c", the control unit 6 can set the operation mode of the power converting apparatus to the direct-current input mode.

Operation at the point in time xc is explained. At the point in time xc, the phase of the power supply current is antiphase to the phase at the points in time "a", "b", and "c". This means that the electric power is supplied to the alternating-current power supply Vac. On the other hand, a minus value of the direct-current power supply current is larger than the minus value at the point in time "c".

The width between the plus envelope signal env1 and the minus envelope signal env2 is the same as the width at the points in time "a", "b", and "c". Therefore, there is no change in the electric power supplied to the load 5. That is, at the point in time xc, the electric power from the direct-current power supply Vdc is supplied to not only the load circuit 10 but also the alternating-current power supply Vac.

The operation at the point in time xc coincides with the operation in the direct-current input and alternating-current output mode. That is, by setting the level of the control terminal CTL to a minus value, the control unit 6 can set the operation mode of the power converting apparatus to the direct-current input and alternating-current output mode.

Operation at the point in time xa is explained. At the point in time xa, the amplitude of the envelope signals env1 and env2 is larger than the amplitude at the point in time "a". According to the increase in the amplitude, the alternating-current power supply current increases. On the other hand, the direct-current power supply current shifts in the plus direction as a whole and changes to a plus value. The plus direct-current power supply current means that the electric power is supplied to the direct-current power supply Vdc.

The width between the plus envelope signal env1 and the minus envelope signal env2 is the same as the width at the points in time "a", "b", "c", and xc. Therefore, there is no change in the electric power supplied to the load 5. That is, at the point in time xa, the electric power from the alternating-current power supply Vac is supplied to not only the load circuit 10 but also the direct-current power supply Vdc.

The operation at the point in time xa coincides with the operation in the alternating-current input and direct-current output mode. That is, by setting the level of the control terminal CTL larger than the level n at the point in time "a", the control unit 6 can set the operation mode of the power converting apparatus to the alternating-current input and direct-current output mode.

As explained above, by adjusting the level of the control signal CTL, the power converting apparatus 100 can selectively switch and use the five operation modes, i.e., the alternating-current input mode, the alternating-current input and direct-current input mode, the direct-current input mode, the alternating-current input and direct-current output mode, and the direct-current input and alternating-current output mode.

If the alternating-current input mode and the alternating-current input and direct-current output mode are selected, the alternating-current power supply Vac can be used as a 100% power supply source to the load circuit 10 or the load 5. Similarly, if the direct-current input or the direct-current input and alternating-current output mode is selected, the direct-current power supply Vdc can be used as a 100% power supply source to the load circuit 10 or the load 5. On the other hand, if the alternating-current input and direct-current input mode is selected, the alternating-current power supply Vac and the direct-current power supply Vdc can be used as a power supply source to the load circuit 10 or the load 5. A supply ratio of the power supply source can be optionally set. Moreover, in all the operation modes, since there is no fluctuation in a power supply amount to the load 5, it is possible to guarantee stable operation.

If the alternating-current input and direct-current output mode is selected, the electric power can be supplied from the alternating-current power supply Vac to not only the load 5 but also the direct-current power supply Vdc. Therefore, if the direct-current power supply Vdc is a rechargeable battery, for example, it is possible to charge the direct-current power supply Vdc while driving the load 5.

If the direct-current input and alternating-current output mode is selected, the electric power from the direct-current power supply Vdc can be supplied to not only the load 5 but also the alternating-current power supply Vac. Therefore, even if the alternating-current power supply Vac is a commercial power supply and a power failure occurs in the commercial power supply, it is possible to supply the electric power to a system of the alternating-current power supply Vac using the electric power of the direct-current power supply Vdc while continuing the power supply to the load 5. There is an advantage that it is possible to use the alternating-current power supply Vac even if a power failure occurs.

As explained above, it is possible to realize an extremely variable function as a mechanism for supplying the electric power to the load 5. It is possible to effectively use the electric power by, for example, normally using the alternating-current power supply Vac of the commercial power supply and, if a power failure occurs, quickly switching the alternating-current power supply Vac to the direct-current power supply Vdc of the battery. It is possible to prevent an operation stop of the load due to a power failure. The power supplies are valuably used as a two-system power supply in a variety of industrial fields. Therefore, alternating-current and direct-current power sources can supplement each other and operate even if the power sources are unstable. It is possible to provide a power supply system with high reliability.

The power converting apparatus 100 operates under a condition of ZVS (zero voltage switching). Therefore, it is possible to realize power conversion with extremely little switching loss and high efficiency. Consequently, there is a great effect of use in all industrial fields where an energy saving effect is expected.

Note that, in the example explained in the embodiment, the five operation modes are switched by linearly adjusting the level of the control signal CTL from the outside. The control signal CTL is not limited to be linearly adjusted in the level. The control signal CTL adjusted in the level stepwise may be applied. In this case, the power converting apparatus 100 may include a data table in which levels of the control signal CTL and the operation modes are associated in a one-to-one relation. The control unit 6 may determine an operation mode referring to the data table on the basis of a level of the control signal CTL input from the outside.

Figure 10:
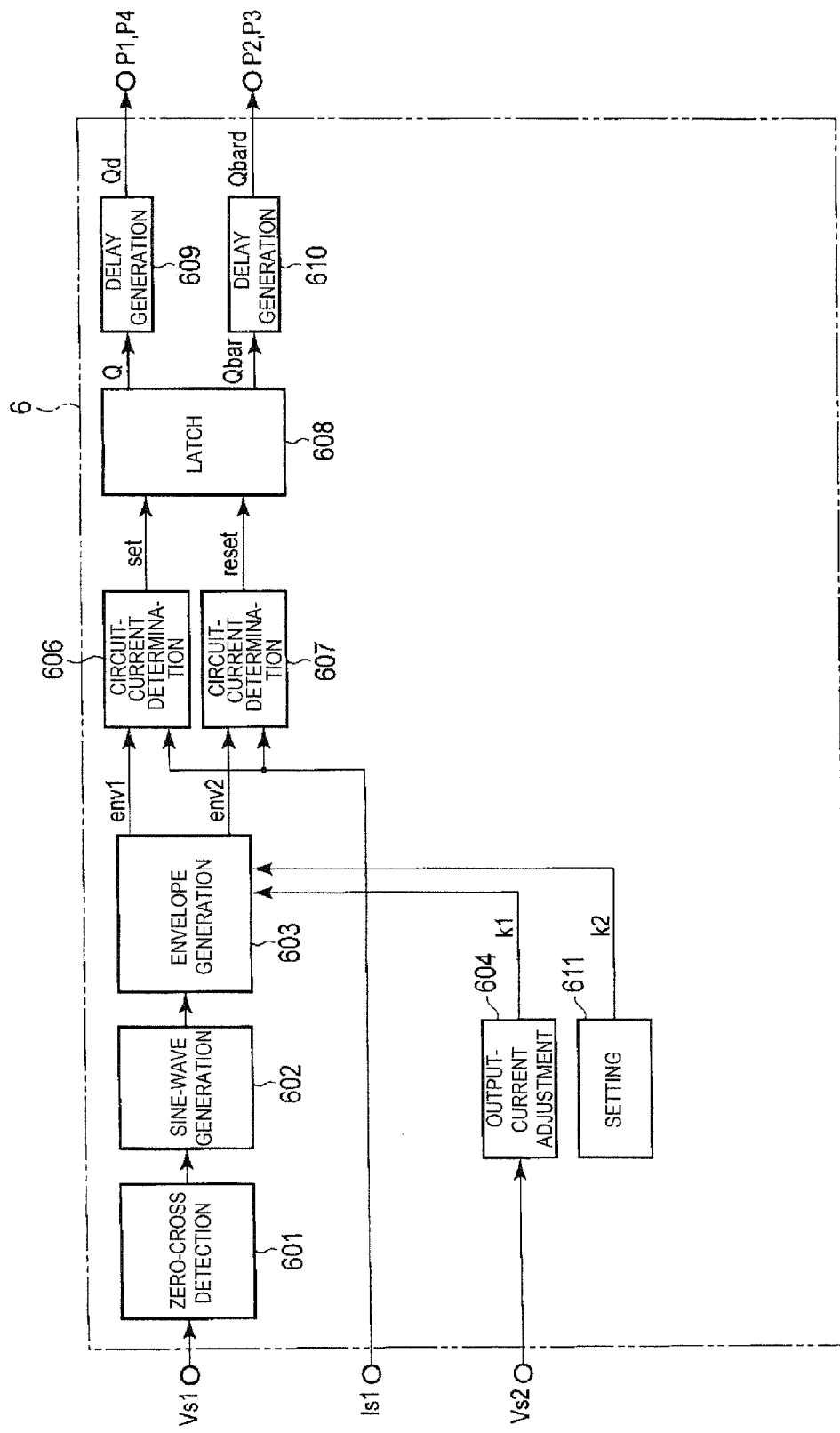
FIG. 10 is a block diagram showing a control unit in another embodiment.

As shown in FIG. 10, a setting unit 611 for the coefficient k2 may be provided instead of the direct-current adjusting unit 605 to output the fixed coefficient k2 to the envelope generating unit 603. With such a configuration, it is possible to utilize the power converting apparatus 100 as a dedicated machine for any one of the operation modes according to a value of the coefficient k2 set by the setting unit 611.

The several embodiments of the present invention are explained above. However, these embodiments are presented as examples and are not intended to limit the scope of the invention. These new embodiments can be carried out in other various forms. Various omissions, substitutions, and changes can be performed without departing from the spirit of the invention. These embodiments and modifications thereof are included in the scope and the gist of the invention and included in the inventions described in claims and a scope of equivalents of the inventions.

What is claimed is:

1. A power converting apparatus comprising:
a power conversion circuit in which a first switch and a second switch are connected in series, a third switch and a fourth switch are connected in series, and the first switch and the third switch are connected to each other and the second switch and the fourth switch are connected to each other to form a closed loop, an alternating-current power supply, a first inductor, and a first capacitor are connected in series to form a closed loop, a series circuit formed by the first capacitor, a second inductor, and a primary winding wire of a transformer is connected between a connection point of the first switch and the second switch and a connection point of the third switch and the fourth switch, a direct-current power supply is connected to both ends of the third switch and the fourth switch, and a load or a load circuit is connected to a secondary winding wire of the transformer, wherein
the control unit supplies, on the basis of a power supply voltage obtained from a unit that detects a voltage of the alternating-current power supply, a circuit current obtained from a unit that detects a circuit current flowing in the power conversion circuit, and a direct current obtained from a unit that detects an electric current flowing in the direct-current power supply, a pulse signal for alternately opening and closing a pair of the first switch and the fourth switch and a pair of the second switch and the third switch to the pair of the first switch and the forth switch and the pair of the second switch and the third switch such that an electric current in which a high-frequency component is mixed in a low-frequency component of the alternating-current power supply flows to the power conversion circuit.

2. The apparatus according to claim 1, wherein the control unit includes:
a sine-wave generating unit configured to generate a sine wave in phase with the voltage of the alternating-current power supply on the basis of a voltage signal detected by the unit that detects the voltage of the alternating-current power supply;
an envelope generating unit configured to determine, on the basis of the sine wave generated by the sine-wave generating unit, from a voltage signal obtained from a unit that detects the voltage applied to the load and a current signal obtained from the unit that detects the electric current flowing in the direct-current power supply, a target value of the electric current flowing in the alternating-current power supply and generates plus and minus envelopes with a predetermined allowance given to the target value; and
a pulse generating unit configured to determine whether a circuit current obtained from the unit that detects the electric current flowing in the power conversion circuit is within a range of the plus envelope and the minus envelope and generates the pulse signal at timing when the circuit current deviates from the range of the plus envelope and the minus envelope.

3. The apparatus according to claim 1, wherein the control unit includes:
a sine-wave generating unit configured to generate a sine wave in phase with the voltage of the alternating-current power supply on the basis of a signal of an alternating-current voltage detected by the unit that detects the voltage of the alternating-current power supply;
an envelope generating unit configured to determine, on the basis of the sine wave generated by the sine-wave generating unit, from a voltage signal obtained from a unit that detects the voltage applied to the load and a current signal obtained from the unit that detects the electric current flowing in the direct-current power supply, a target value of the electric current flowing in the alternating-current power supply and generates plus and minus envelopes with a predetermined allowance given to the target value; and
a pulse generating unit configured to determine whether a circuit current obtained from the unit that detects the electric current flowing in the power conversion circuit is within a range of the plus envelope and the minus envelope and generates the pulse signal at timing when the circuit current deviates from the range of the plus envelope and the minus envelope.

4. The apparatus according to claim 2, wherein
the control unit further includes an output-current adjusting unit configured to output a first coefficient for adjusting an output current according to the voltage signal obtained from the unit that detects the voltage applied to the load, and
the envelope generating unit increases the width between the plus envelope and the minus envelope if the first coefficient is a value for adjusting the output current to increase and reduces the width between the plus envelope and the minus envelope if the first coefficient is a value for adjusting the output current to decrease.

5. The apparatus according to claim 2, wherein
the control unit further includes a direct-current adjusting unit configured to output a second coefficient for adjusting amplitude of the plus envelope and the minus envelope according to the current signal obtained from the unit that detects the electric current flowing in the direct-current power supply and a control signal for setting the electric current flowing in the direct-current power supply, and
the envelope generating unit increases the amplitude of the plus envelope and the minus envelope if the second coefficient is a value for adjusting the amplitude to increase and reduces the amplitude of the plus envelope and the minus envelope if the second coefficient is a value for adjusting the amplitude to decrease.

* * * * *